United States Patent [19]

Nelson et al.

[11] Patent Number: 4,814,298

[45] Date of Patent: Mar. 21, 1989

[54] LEAD-FREE GLASSES FOR GLAZE MATERIALS

[75] Inventors: John W. Nelson, Painted Post; Linda R. Pinckney, Corning, both of N.Y.

[73] Assignee: Corning Glass Works, Corning, N.Y.

[21] Appl. No.: 112,284

[22] Filed: Oct. 26, 1987

[51] Int. Cl.$^4$ .............. C03C 8/14; C03C 8/20; C03C 8/02

[52] U.S. Cl. .................... 501/17; 501/18; 501/21; 501/32; 501/67

[58] Field of Search .............. 501/15, 17, 32, 67, 501/18, 21

[56] References Cited

U.S. PATENT DOCUMENTS

| | | | |
|---|---|---|---|
| 3,258,350 | 6/1966 | Martin et al. | 501/18 |
| 3,499,776 | 3/1970 | Baak et al. | 501/67 |
| 3,645,839 | 2/1972 | Veres | 501/10 |
| 3,984,252 | 10/1976 | Kiefer | 501/67 |
| 4,186,023 | 1/1980 | Dumesnil et al. | 501/58 |
| 4,259,118 | 3/1981 | Sack | 501/67 |
| 4,367,012 | 1/1983 | Ikeda et al. | 501/67 |
| 4,438,211 | 3/1984 | Mennemann et al. | 501/67 |
| 4,565,791 | 1/1986 | Boudot | 501/67 |
| 4,665,039 | 5/1987 | Kokubu et al. | 501/67 |

FOREIGN PATENT DOCUMENTS 791374  2/1958  United Kingdom ............... 501/67

Primary Examiner—Mark L. Bell
Attorney, Agent, or Firm—Clinton S. Janes, Jr.

[57] ABSTRACT

This invention is directed to lead-free and, where desired, cadmium-free frits for glazes and enamels, said frits consisting essentially, in mole percent on the oxide basis, of

| | | | |
|---|---|---|---|
| $SiO_2$ | 55–75 | $Na_2O$ | 3–9 |
| $B_2O_3$ | 8–13 | $ZrO_2$ | 2–5 |
| $Al_2O_3$ | 0.5–3 | BaO | 0.5–16 |

Various inert refractory materials may be included as fillers.

14 Claims, No Drawings

LEAD-FREE GLASSES FOR GLAZE MATERIALS

BACKGROUND OF THE INVENTION

The use of glazes to decorate articles of glass and ceramic materials goes back into antiquity. Glazes are, essentially, glassy or vitreous coatings which not only can improve the aesthetic appearance of the articles to which such as applied, but also, in the case of ceramic articles, provide a non-porous, impermeable surface coating. In general, glazes have been defined as clear glasses; colored glazes have been defined as clear glasses with colorants dissolved therein; and enamels have been defined as glazes containing pigments or particles of other materials suspended therein.

Glazes and enamels are customarily applied to the surface of a glass, glass-ceramic, or ceramic article in the form of very finely-divided particles or powder, commonly known in the art as "frit," suspended in a volatile liquid vehicle to make a paste or slurry. This paste or slurry is then first fired at a relatively low temperature to burn off the vehicle (normally an organic liquid), and thereafter at a higher temperature to fuse the frit into a strongly-adherent, continuous film on the surface of the article.

Frits operable as glazes and enamels normally exhibit five criteria:

First, the firing or maturing temperature of the frit, i.e., the temperature at which the frit will flow sufficiently to yield a smooth uniform coating on an article, will generally be low enough to avoid thermal deformation of the article;

Second, the linear coefficient of thermal expansion of the frit will be compatible with that of the article being coated to prevent crazing and/or spalling; advantageously, the coefficient of thermal expansion of the frit will be a little below that exhibited by the article such that the fired coating will be under compression when the article is cooled to room temperature;

Third, the frit will commonly demonstrate good resistance to weathering and to attack by acids and alkalies; corrosion of the coating can lead to loss of gloss, the generation of haze and/or iridescence, the development of porosity, and/or other effects deleterious to the appearance or physical character of the coating;

Fourth, the frit will customarily display good glass stability, i.e., the frit will resist devitrification during firing, unless it is designed to function as a thermally devitrifiable frit; and Fifth, where a glossy decorative glaze or enamel is sought, the refractive index of the frit must be high.

Most commercially-marketed glazes and enamels contain substantial concentrations of lead oxide (PbO) and, in some instances, cadmium oxide (CdO) or a combination of PbO and CdO. Those oxides have the capability of softening the frit, i.e., lowering the melting point and, hence, the temperature for fusing the frit onto an article, and, in addition, of raising the refractive index of the frit. CdO has also been employed as a colorant in certain frits. Both of those ingredients, however, are subject to the disadvantage of being toxic. hence, care must be exercised by workers using those materials and glazes and enamels which contain those metals must exhibit extremely good resistance to attack by acids and bases when used in contact with food. Thus, release of any significant amount of those metals must be avoided.

In view of the toxicity inherent in lead and cadmium, considerable research has been undertaken to discover glazes and enamels free of those metals, but which still satisfy the above five criteria. The following patents are illustrative of such research.

U.S. Pat. No. 4,084,976 describes lead-free glazes especially designed for use with alumina bodies. Those glazes consisted essentially, in weight percent on the oxide basis, of

| $SiO_2$ | 50–54 | BaO | 2–5 |
| $Al_2O_3$ | 5–8 | SrO | 5–8 |
| $B_2O_3$ | 6–12 | ZnO | 1–2 |
| CaO | 4–6 | $Li_2O + Na_2O + K_2O$ | 4–6 |
| MgO | 2–8 | | |

U.S. Pat. No. 4,120,733 discloses lead-free glazes statedly an improvement upon the compositions of U.S. Pat. No. 4,084,976 and consisting essentially, in weight percent on the oxide basis, of

| $SiO_2$ | 48–54 | CaO | 2–3 |
| $Al_2O_3$ | 7–11 | ZnO | 2–2.5 |
| $B_2O_3$ | 16.5–20 | $Na_2O$ | 4.25–5.25 |
| CaO | 4–6 | $K_2O$ | 0.4–1 |
| BaO | 11–14 | | |

U.S. Pat. No. 4,224,074 presents lead- and cadmium-free glazes consisting essentially, in weight percent on the oxide basis, of

| $SiO_2$ | 29–55 | $Na_2O$ | 4–20 |
| $Al_2O_3$ | 2–8 | $Li_2O$ | 0–7 |
| $B_2O_3$ | 7–31 | $Na_2O + Li_2O$ | 6–24 |
| $ZrO_2$ | 5–16 | F | 0.75–4 |

U.S. Pat. No. 4,282,035 concerns lead- and cadmium-free glazes consisting essentially, in weight percent on the oxide basis, of

| $SiO_2$ | 51–60 | $Na_2O$ | 0–5 |
| $B_2O_3$ | 4.5–8 | $K_2O$ | 0–5 |
| BaO | 0–13 | $Li_2O + Na_2O + K_2O$ | 1–5 |
| SrO | 0–18 | MgO | 0–6 |
| BaO + SrO | 6–30 | CaO | 0–12 |
| $ZrO_2$ | 4–8 | $Bi_2O_3$ | 0–10 |
| $Al_2O_3$ | 5–8 | $MgO + CaO + Bi_2O_3$ | 0–20 |
| $Li_2O$ | 0–4 | | |

U.S. Pat. No. 4,285,731 defines lead- and cadmium-free glazes consisting essentially, in weight percent on the oxide basis, of

| $SiO_2$ | 35–47 | SrO | 0–8 |
| $B_2O_3$ | 5.5–9 | MgO | 0–5 |
| BaO | 24–42 | CaO | 0–4 |
| $TiO_2$ | 1.5–4 | ZnO | 0–10 |
| $ZrO_2$ | 6–10 | $Bi_2O_3$ | 0–8 |
| $Li_2O$ | 1–5 | $SrO + MgO + CaO + ZnO + Bi_2O_3$ | 0–10 |

U.S. Pat. No. 4,311,504 describes lead-free glazes having the same base compositions as the glazes defined in U.S. Pat. No. 4,285,731, but also containing 2–10% cadmium sulfoselenide to impart a bright red coloration to the fired glaze.

SUMMARY OF THE INVENTION

The principal objective of the instant invention was to develop glazes and enamels free from lead and, where desired, free from cadmium that would satisfy the above five criteria for glazes, and which would be particularly appropriate for firing onto glass-ceramic articles wherein canasite constitutes the predominant crystal phase. U.S. Pat. No. 4,386,162 discloses the preparation of glass-ceramic articles containing canasite as the predominant crystal phase and that patent is incorporated here in its entirety for its disclosure of the composition, microstructure, and method of making such glass-ceramic articles. Such glass-ceramics customarily demonstrate linear coefficients of thermal expansion (25°-300° C.) ranging between about $90-120 \times 10^{-7}/°$ C.

That objective can be accomplished with glaze compositions within the general sodium aluminoborosilicate system containing relatively high levels of BaO and $ZrO_2$. Hence, expressed in terms of mole percent on the oxide basis, of about:

| $SiO_2$ | 55-75 | $Na_2O$ | 3-9 |
|---|---|---|---|
| $B_2O_3$ | 8-13 | $ZrO_2$ | 2-5 |
| $Al_2O_3$ | 0.5-3 | BaO | 0.5-16 |

The inclusion of $ZrO_2$ insures high chemical durability along with good surface scratch and strain resistance, and, in combination with BaO, raises the refractive index of the glasses leading to the presence of high gloss in the final fired glaze.

The above base compositions can be adjusted to yield glasses exhibiting softening points generally within the temperature interval of 640°-800° C. and linear coefficients of thermal expansion (25°-300° C.) ranging between $45°-90 \times 10^{-7}/°C$. Inasmuch as the softening points of the inventive glass vary between about 640°-800° C., frits prepared therefrom flow sufficiently at about 800°-925° C. to produce smooth, pin hole-free coatings. Those low firing temperatures permit the application of glazes which will retain bright colors such as red and yellow, thereby imparting an advantage over many commercial glazes requiring higher firing temperatures. Underglaze decorations are also made possible through the use of the inventive glasses because of their low firing temperatures.

Up to about 12 mole percent total of various compatible metal oxides may optionally be incorporated into the base composition system to modify the properties of the frits in a desired manner. Such additions may include, for example, up to about 5% of $K_2O$, up to about 10% $Li_2O$, up to about 2% MgO, up to about 5% CaO, up to about 3% SrO, and up to about 2% ZnO.

The preferred ranges of base components consist essentially of:

| $SiO_2$ | 55-75 | $Na_2O$ | 5-8 |
|---|---|---|---|
| $B_2O_3$ | 9-13 | $ZrO_2$ | 2-5 |
| $Al_2O_3$ | 1-2 | BaO | 1-16 |

A broad range of colors can be obtained either by adding a colorant to the batch before melting or by adding pigments to the powdered frit prior to its application and firing onto an article. Examples of operable colorants, generally in amounts up to about 2% by weight, include: CoO, $Cr_2O_3$, $Cu_2O$, $Fe_2O_3$, $MnO_2$, NiO, Se, $SnO_2$, $TiO_2$, $V_2O_5$, the rare earth elements, and, where desired, CdS.

The inventive frits are also suitable for mixing with various fillers prior to firing to a glaze. The use of inert refractory materials such as $Al_2O_3$, BaO, CaO, MgO, $SiO_2$, $TiO_2$, $WO_3$, $Y_2O_3$, zircon, and $ZrO_2$ is rendered possible because the low firing temperatures operable with the inventive frits inhibit any significant reaction taking place between the glass frit and the filler U.S. Pat. No. 3,250,631 discloses the use of inert refractory oxides and silicates as fillers to modify the physical properties of glasses, providing working examples utilizing fused quartz and $\beta$-eucryptite to reduce the coefficient of thermal expansion of sealing glasses. U.S. Pat. No. 3,258,350 is expressly directed to the use of zircon for the same purpose of U.S. Pat. No. 3,645,839 specifically cites the utility of aluminum titanate to lower the thermal contraction of sealing glasses. Furthermore, sand and zircon have been incorporated into commercially-marketed tiles for added friction, scratch resistance, chemical durability, and/or to impart an "earthy" or matte appearance.

It can be appreciated that, by varying the amount of filler added, one can control the changes in physical properties and/or visual appearance desired in a glaze composition. Customarily, the concentration of filler added will be kept below a level where the properties of the glaze, particularly its ability to satisfactorily flow and wet the surfaces of the article to be coated, are seriously affected. Nevertheless, where improved surface friction is desired through the presence of filler particles being exposed from the glaze surface, quantities up to 75% by weight may be included in the glaze composition.

With respect to canasite glass-ceramics, the inventive frits may be applied to the precursor canasite glass body and the coated body thereafter fired to simultaneously convert the glass body to a glass-ceramic and to provide a glaze thereon; hence, a cost-effective, one-step crystallization/glaze process is possible. The frits may also, of course, be fired to a glaze coating on the crystallized glass-ceramic article. The glazes improve the chemical durability and scratch resistance of the canasite glass-ceramics. Furthermore, because the linear coefficient of thermal expansion of the glaze is less than that of the glass-ceramic, the surface compression layer produced thereby enhances the mechanical strength of the glass-ceramic body. Thus, as was noted above, the linear coefficient of thermal expansion of the inventive frits (25°-300° C.) ranges between about $45°-90 \times 10^{-7}/°C$.; moreover, as was also observed above, those values can be substantially altered through the incorporation therein of fillers having various linear coefficients of thermal expansion. For example, the inclusion of particles of fused $SiO_2$ or $\beta$-spodumene solid solution would lower the expansion, whereas particles of nepheline, quartz, cristobalite, or MgO would raise the expansion. Because quartz exhibits a refractive index quite close to that of the glaze, its use as an additive is advantageous in maintaining the transparency of the glaze. In contrast, the refractive index of zircon is much higher than that of the glaze such that its addition results in a translucent to opaque coating.

The good chemical durability and resistance to scratches and stains exhibited by the instant glazes have recommended their utility in such high impact applications as floor and wall tiling, exterior building cladding and interior panelling, and kitchen and laboratory countertops.

DESCRIPTION OF PREFERRED EMBODIMENTS

TABLE I

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 66.5 | 66.5 | 66.6 | 66.0 | 62.3 | 56.9 | 66.0 | 64.0 | 66.0 | 66.0 | 66.0 | 50.0 | 49.0 | 65.3 | 56.0 | 50.0 |
| $B_2O_3$ | 13.2 | 13.5 | 13.2 | 12.5 | 11.8 | 10.8 | 12.5 | 13.5 | 13.0 | 12.5 | 13.0 | 10.0 | 8.8 | 12.9 | 12.0 | 10.0 |
| $Al_2O_3$ | 2.5 | 2.6 | 2.4 | 2.0 | 1.9 | 1.7 | 2.0 | 2.5 | 2.5 | 2.0 | 2.4 | 2.0 | 1.4 | 2.4 | 1.5 | 2.0 |
| $Na_2O$ | 7.0 | 7.0 | 6.7 | 6.5 | 6.1 | 5.6 | 6.5 | 7.5 | 6.5 | 6.5 | 5.8 | 3.0 | 4.5 | 6.6 | 5.0 | 5.0 |
| $ZrO_2$ | 8.0 | 8.0 | 7.7 | 7.5 | 7.1 | 6.5 | 5.5 | 8.5 | 9.0 | 5.0 | 7.2 | 5.0 | 4.8 | 7.5 | 5.0 | 5.0 |
| CaO | 1.4 | 1.0 | 1.0 | 1.0 | 0.9 | 0.9 | 1.0 | 1.0 | — | — | 0.4 | — | — | 1.0 | — | — |
| BaO | 2.0 | 2.0 | 3.0 | 4.1 | 9.4 | 13.3 | 4.1 | 3.0 | 3.0 | 8.0 | 3.0 | 22.0 | 30.0 | 2.9 | 14.0 | 20.0 |
| MgO | 0.2 | 0.2 | 0.2 | 0.2 | 0.2 | 0.2 | 0.2 | — | — | — | — | — | — | 0.2 | — | — |
| ZnO | 0.2 | 0.2 | 0.2 | 0.2 | 0.2 | 0.2 | 0.2 | — | — | — | 0.2 | — | — | 0.2 | — | — |
| $Li_2O$ | | | | | | | | | | | 2.0 | 3.0 | 0.5 | | 2.0 | 3.0 |
| $K_2O$ | | | | | | | 2.0 | | | | — | 5.0 | 1.0 | | 4.5 | 5.0 |
| NiO | | | | | | | | | | | | | | 1.0 | | |
| Exp. | 49.1 | 48.6 | 48.0 | 49.5 | 52.6 | 56.5 | 56.1 | 52.9 | 46.5 | 49.7 | — | — | — | 75.4 | — | — |
| Soft. | — | — | — | 788 | 773 | — | 769 | — | — | — | 718 | 646 | 728 | — | 679 | 646 |

TABLE IA

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 71.7 | 71.8 | 72.1 | 72.5 | 70.7 | 69.0 | 72.2 | 70.5 | 72.9 | 73.5 | 70.6 | 60.2 | 63.2 | 71.5 | 64.4 | 59.4 |
| $B_2O_3$ | 12.3 | 12.6 | 12.3 | 11.8 | 11.6 | 11.3 | 11.8 | 12.8 | 12.4 | 12.0 | 12.0 | 10.4 | 9.8 | 12.2 | 11.9 | 10.3 |
| $Al_2O_3$ | 1.6 | 1.7 | 1.5 | 1.3 | 1.3 | 1.2 | 1.3 | 1.6 | 1.6 | 1.3 | 1.5 | 1.4 | 1.1 | 1.5 | 1.0 | 1.4 |
| $Na_2O$ | 7.3 | 7.3 | 7.0 | 6.9 | 6.7 | 6.6 | 6.9 | 8.0 | 7.0 | 7.0 | 6.0 | 3.5 | 5.6 | 7.0 | 5.6 | 5.8 |
| $ZrO_2$ | 4.2 | 4.2 | 4.1 | 4.0 | 3.9 | 3.8 | 2.9 | 4.6 | 4.8 | 2.7 | 3.8 | 2.9 | 3.0 | 4.0 | 2.8 | 2.9 |
| CaO | 1.6 | 1.2 | 1.2 | 1.2 | 1.1 | 1.2 | 1.2 | 1.2 | — | — | 0.5 | — | — | 1.2 | — | — |
| BaO | 0.8 | 0.8 | 1.3 | 1.8 | 4.2 | 6.3 | 1.8 | 1.3 | 1.3 | 3.5 | 1.3 | 10.4 | 15.2 | 1.2 | 6.3 | 9.3 |
| MgO | 0.3 | 0.3 | 0.3 | 0.3 | 0.3 | 0.4 | 0.3 | — | — | — | — | — | — | 0.3 | — | — |
| ZnO | 0.2 | 0.2 | 0.2 | 0.2 | 0.2 | 0.2 | 0.2 | 0.8 | — | — | 0.2 | — | — | 0.2 | — | — |
| $Li_2O$ | | | | | | | — | — | — | — | 4.3 | 7.3 | 1.3 | — | 4.6 | 7.1 |
| $K_2O$ | | | | | | | 1.5 | — | — | — | — | 3.8 | 0.8 | — | 3.3 | 3.8 |
| NiO | | | | | | | | | | | | | | 0.9 | — | — |

Table I reports several frit compositions, expressed in terms of parts by weight on the oxide basis, illustrating the instant invention. Inasmuch as the sum of the individual components totals or closely approximates 100, for all practical purposes the tabulated values may be deemed to reflect weight percent. The actual batch ingredients may be any materials, either oxides or other compounds, which, when melted together, will be converted into the desired oxide in the required proportion. For example, $BaCO_3$ may comprise the source of BaO. Table IA records the compositions in approximate mole percent.

Batches for the exemplary compositions were compounded, thoroughly mixed together to assist in securing a homogeneous melt, and charged into platinum crucibles. The crucibles were introduced into a furnace operating at about 1500° C. and the batches melted for about 4–5 hours. The melts were poured into steel molds to produce glass slabs having dimensions of about 3"×3"×0.5" or poured as a relatively thin stream into cold water (drigaged), which results in small particles of glass. Bars were cut from the slabs for use in determining the softening point and linear coefficient of thermal expansion in accordance with measuring techniques conventional in the glass art. Table I records the softening point (Soft.) in °C. and the linear coefficient of thermal expansion (Exp.) over the range of 25°–300° C. expressed in terms of $\times 10^{-7}$/°C., where measured on the glass. The finely-divided, drigaged material was further comminuted through milling to particles of frit having an average diameter ranging between about 10–60 microns.

It will be appreciated that, whereas the above mixing, melting, and forming procedures reflect laboratory activity, the compositions of Table I are capable of being processed utilizing mixing, melting, and forming practices conventionally used in commercial glassmaking.

The frit was dry mixed with powdered clay and that combination blended into a 4 weight percent Rhoplex-®/water mixture to form a slurry; the amount of clay being sufficient to decrease the setting rate of the particles in the slurry. Rhoplex ® is an organic resin suspension marketed by Rohm and Haas Company, Philadelphia, Pa., used in commercial coatings. The clay component comprised about 4–5% by weight of the slurry; the Rhoplex ®/water mixture constituted about 20–35% by weight of the slurry; and the frit made up the remainder.

The slurry was hand sprayed onto the surface of a glass tile prepared in accordance with U.S. Pat. No. 4,386,162, supra, having dimensions of 4"×4"×0.25" and dried for about 10 minutes in a stream of air at room temperature. The tile was thereafter introduced into an electrically-fired furnace and the temperature raised therein at a rate of about 200° C./hour to temperatures within the range of about 870°–900° C. to fuse the frit. After about 1–2 hours at the top temperature to crystallize the glass to a glass-ceramic containing canasite as the predominant crystal phase and to mature the glaze into a smooth, pore-free, strongly adherent coating, the electric current to the furnace was cut off and the furnace allowed to cool to room temperature with the tile retained therein. The heating rate of about 200° C./hour was sufficiently slow to safely burn off the organic component Rhoplex ®. The thickness of the resultant glaze ranged about 0.003"–0.005" (~75–125 microns). Example 14 manifested a clear light brown coloration.

The glazes produced from frits having the compositions of Examples 1–16 exhibited good gloss, good glass stability, no evidence of crazing or spalling, and good resistance to attack by acids and bases. A qualitative measure of chemical durability with respect to acids and bases was obtained through a visual examination of samples after an immersion for 16 hours at room temperature in separate baths consisting of 5% by weight aqueous solution of acetic acid, 5% by weight aqueous solution of NaOH, and 5% by weight aqueous solution of $H_2SO_4$. Essentially no change in gloss or the presence of other surface defect was observed upon a visual inspection of the samples after each immersion.

To investigate the applicability of the inventive frits with fillers, the laboratory work described below was undertaken utilizing the frit of Example 3. Thus, zircon was comminuted through milling to form powders having an average particle size of about 10 microns. Various amounts of those powder fractions of zircon were dry mixed into the frit/clay combination and that three-component combination blended into the 4% by weight Rhoplex®/water mixture. The resultant slurry was hand sprayed onto the surface of a glass tile, dried, and then fired in like manner to the procedure described above for the frits alone.

Table II records the weight percentage of the zircon incorporated, the average particle size of the frit as derived through screening of the comminuted particles, and a visual appraisal of the finish manifested by the glaze.

TABLE II

| % Zircon | Particle Fraction | Finish |
| --- | --- | --- |
| 10 | 20 microns | Good Gloss |
| 30 | " | " |
| 45 | " | Good Gloss |
| 50 | " | Satin |
| 55 | " | Satin |
| 60 | " | Matte |
| 55 | 10 microns | Satin |
| 55 | 33 microns | Satin |
| 55 | 60 microns | Matte |

As can be seen, very substantial concentrations of filler can be included with the frit. The use of inexpensive fillers obviously reduces the overall cost of the glaze. Moreover, as is evident, the surface finish of the glaze can be modified by additions of filler. Furthermore, and unexpectedly, the size of the frit particles can be used to influence the overall character of the filler-containing glaze. Thus, in general, the larger the particles, the greater their effect upon the appearance of the glaze. Accordingly, where good gloss is a requirement, the particle size of the frit will preferably be held below about 25 microns and the amount of frit above about 50% by weight.

Table III illustrates the use of quartz particles as fillers with the inventive frits. In like manner to the zircon-frit mixtures described above in Table II, the frit was dry mixed with powdered clay and that mixture blended into the 4 weight percent Rhoplex®/water solution. Again, the clay comprised about 4–5% by weight of the resultant slurry which was handsprayed onto the surface of a glass tile, dried, and fired following the procedure described above for the frits alone.

Table III records the top temperature and time to which the dried slurry was subjected (Heat Treatment), the average particle size of the quartz expressed in terms of microns, the average particle size of the frit, the weight percent of quartz, and a visual appraisal of the finish displayed by the glaze.

TABLE III

| Example | Heat Treatment | Size of Quartz | Size of Frit | % Quartz | Finish |
| --- | --- | --- | --- | --- | --- |
| 15 | 890° C.-2 hrs | ~10 | ~10 | 50 | Satin |
| 15 | " | ~10 | ~10 | 60 | Satin |
| 15 | 850° C.-2 hrs | ~10 | ~10 | 50 | Satin |
| 15 | " | ~10 | ~10 | 60 | Matte |
| 15 | " | ~10 | ~10 | 40 | Satin |
| 15 | " | ~10 | ~10 | 20 | Glossy |
| 15 | 870° C.-2 hrs | ~10 | ~10 | 40 | Satin |
| 15 | " | ~25 | ~10 | 55 | Matte |
| 15 | " | ~45 | ~10 | 55 | Matte |
| 15 | 890° C.-2 hrs | ~25 | ~10 | 55 | Satin |
| 15 | " | ~45 | ~10 | 55 | Satin |
| 16 | " | ~10 | ~10 | 50 | Satin |
| 16 | " | ~10 | ~10 | 60 | Satin |
| 16 | 890° C.-2 hrs | ~10 | ~10 | 50 | Glossy |
| 16 | " | ~10 | ~10 | 60 | Satin |

The action of the frit particles when mixed with a filler has not been fully explained. It appears that the presence of the filler inhibits the flow of the frit particles, since in the absence of the filler the frit particles melt and flow readily at temperatures within the range of 800°–900° C. It has been conjectured that the filler in some way acts as an insulating material.

Where a "non-skid" surface is desired, coarse particles of inert, crystalline filler materials, for example, sand and zircon, will normally be utilized to provide the roughened surface, because those particles will provide a more abrasive surface than frit particles. As can be appreciated, of course, the use of coarse-grained particles requires care in the selection of the filler. That is, in applications where good chemical durability is demanded, the filler must exhibit that property.

Experience has indicated that the preferred area of frit composition is dependent upon whether fillers are included in the glaze. Hence, when filler particles are absent, the most preferred area for appearance and physical properties of the glaze resides in compositions in the vicinity of Example 13 or, to a somewhat lesser extent, in the vicinity of Example 3. In contrast, because the inclusion of filler particles inhibits the flow characteristics of the glaze during maturation, a softer glaze (lower softening point) works better. Accordingly, compositions containing greater concentrations of alkali metal oxides, such as Examples 15 and 16, are preferred, particularly when high levels of fillers are to be incorporated. Such frits can exhibit softening points 100°–150° C. lower than demonstrated in the low alkali, high silica compositions such as Examples 3 and 13.

Therefore, where filler particles are absent, the most preferred frits will consist essentially, expressed in terms of mole percent on the oxide basis, of

| $SiO_2$ | 60–75 | $Na_2O$ | 5–8 |
| --- | --- | --- | --- |
| $B_2O_3$ | 9–13 | $ZrO_2$ | 2.5–4.5 |
| $Al_2O_3$ | 1–2 | BaO | 1–16 |

On the other hand, where high levels of fillers are to be added, the most preferred frits will consist essentially, expressed in terms of mole percent on the oxide basis, of

| $SiO_2$ | 58–65 | $Na_2O$ | 5–7 |
| --- | --- | --- | --- |
| $B_2O_3$ | 10–12 | $ZrO_2$ | 2–3.5 |
| $Al_2O_3$ | 1–2 | BaO | 6–15 |

-continued

| | | | |
|---|---|---|---|
| $Li_2O$ | 4-8 | $K_2O$ | 3-5 |

We claim:

1. A frit essentially free of lead demonstrating good glass stability, a linear coefficient of thermal expansion (25°-300° C.) between about $45-90\times10^{-7}$/°C., a viscosity suitable for firing between about 800°-900° C., a softening point between 640°-800° C., and excellent resistance to attack by acids and bases, as evidenced by essentially no visual change in appearance after an exposure of 16 hours at room temperature to a 5% by weight aqueous solution of acetic acid, to a 5% by weight aqueous solution of $H_2SO_4$, and a 5% by weight, aqueous solution of NaOH, said frit consisting essentially, expressed in terms of mole percent on the oxide basis, of

| | | | |
|---|---|---|---|
| $SiO_2$ | 60-75 | $Na_2O$ | 5-8 |
| $B_2O_3$ | 9-13 | $ZrO_2$ | 2.5-4.5 |
| $Al_2O_3$ | 1-2 | BaO | 1-16. |

2. A frit according to claim 1 also containing up to 2% by weight total of a colorant selected from the group consisting of CoO, $Cr_2O_3$, $Cu_2O$, $Fe_2O_3$, $MnO_2$, NiO, CdS, Se, $SnO_2$, $TiO_2$, $V_2O_5$, and rare earth elements.

3. A glaze composition consisting essentially of a frit having a composition according to claim 1 and also containing up to 75% by weight of a filler selected from the group consisting of an inert refractory oxide, an inert refractory silicate, and an inert refractory titanate.

4. A glaze composition according to claim 3 wherein said refractory oxide is selected from the group consisting of $Al_2O_3$, BaO, CaO, MgO, $SiO_2$, $TiO_2$, $WO_3$, $Y_2O_3$, and $ZrO_2$.

5. A glaze composition according to claim 3 wherein said refractory silicate is zircon.

6. A glaze composition according to claim 3 wherein said refractory titanate is aluminum titanate.

7. A glaze composition according to claim 3 wherein said refractory oxide is quartz.

8. A frit essentially free of lead demonstrating good glass stability, a linear coefficient of thermal expansion (25°-300° C.) between about $45-90\times10^{-7}$/°C., a viscosity suitable for firing between about 800°-900° C., a softening point between 640°-800° C., and excellent resistance to attack by acids and bases, as evidenced by essentially no visual change in appearance after an exposure of 16 hours at room temperature to a 5% by weight aqueous solution of acetic acid, to a 5% by weight aqueous solution of $H_2SO_4$, and a 5% by weight aqueous solution of NaOH, said frit consisting essentially, expressed in terms of mole percent on the oxide basis, of

| | | | |
|---|---|---|---|
| $SiO_2$ | 58-65 | $Na_2O$ | 5-7 |
| $B_2O_3$ | 10-12 | $ZrO_2$ | 2-3.5 |
| $Al_2O_3$ | 1-2 | BaO | 6-15 |
| $Li_2O$ | 4-8 | $K_2O$ | 3-5. |

9. A frit according to claim 8 also containing up to 2% by weight total of a colorant selected from the group consisting of CoO, $Cr_2O_3$, $Cu_2O$, $Fe_2O_3$, $MnO_2$, NiO, CdS, Se, $SnO_2$, $TiO_2$, $V_2O_5$, and rare earth elements.

10. A glaze composition consisting essentially of a frit having a composition according to claim 8 and also containing up to 75% by weight of a filler selected from the group consisting of an inert refractory oxide, an inert refractory silicate, and an inert refractory titanate.

11. A glaze composition according to claim 10 wherein said refractory oxide is selected from the group consisting of $Al_2O_3$, BaO, CaO, MgO, $SiO_2$, $TiO_2$, $WO_3$, $Y_2O_3$, and $ZrO_2$.

12. A glaze composition according to claim 10 wherein said refractory silicate is zircon.

13. A glaze composition according to claim 10 wherein said refractory titanate is aluminum titanate.

14. A glaze composition according to claim 10 wherein said refractory oxide is quartz.

* * * * *